United States Patent
Raphael

(10) Patent No.: US 10,554,953 B2
(45) Date of Patent: Feb. 4, 2020

(54) DISTORTION OF VIDEO FOR SEEK IN 360 DEGREE VIDEO

(71) Applicant: GOOGLE LLC, Mountain View, CA (US)

(72) Inventor: Seth Raphael, Redwood, CA (US)

(73) Assignee: GOOGLE LLC, Mountain View, CA (US)

( * ) Notice: Subject to any disclaimer, the term of this patent is extended or adjusted under 35 U.S.C. 154(b) by 110 days.

(21) Appl. No.: 15/844,599

(22) Filed: Dec. 17, 2017

(65) Prior Publication Data

US 2019/0191147 A1 Jun. 20, 2019

(51) Int. Cl.
| | | |
|---|---|---|
| *H04N 7/173* | (2011.01) | |
| *H04N 13/261* | (2018.01) | |
| *H04N 13/194* | (2018.01) | |
| *H04N 13/161* | (2018.01) | |
| *H04N 21/234* | (2011.01) | |
| *H04N 21/472* | (2011.01) | |
| *H04N 21/6587* | (2011.01) | |
| *H04N 21/81* | (2011.01) | |

(52) U.S. Cl.
CPC ......... *H04N 13/261* (2018.05); *H04N 13/161* (2018.05); *H04N 13/194* (2018.05); *H04N 21/234* (2013.01); *H04N 21/47202* (2013.01); *H04N 21/6587* (2013.01); *H04N 21/816* (2013.01)

(58) Field of Classification Search
None
See application file for complete search history.

(56) References Cited

U.S. PATENT DOCUMENTS

| | | | | |
|---|---|---|---|---|
| 6,559,846 | B1 * | 5/2003 | Uyttendaele | G06T 15/005 345/473 |
| 9,721,393 | B1 * | 8/2017 | Dunn | G06T 19/006 |
| 2007/0025688 | A1 * | 2/2007 | Pejhan | H04N 5/783 386/344 |
| 2012/0169842 | A1 * | 7/2012 | Chuang | G08B 13/19619 348/39 |

(Continued)

FOREIGN PATENT DOCUMENTS

WO 2018194954 A1 10/2018

OTHER PUBLICATIONS

Graf, Mario et al., "Towards Bandwidth Efficient Adaptive Streaming of Omnidirectional Video over HTTP", Proceedings of the 8th ACM on Multimedia Systems Conference, Jun. 20, 2017, pp. 261-271, XP055437599.

(Continued)

*Primary Examiner* — William J Kim
(74) *Attorney, Agent, or Firm* — Brake Hughes Bellermann LLP

(57) ABSTRACT

A method includes receiving, from a device displaying a portion of a first frame of a streaming 360 degree video, an indication that a seek operation is triggered, the portion of the first frame being based on a view point of a user of the device, selecting a second frame of the streaming 360 degree video based on the seek operation, encoding a first portion of the second frame and a second portion of the second frame, the first portion of the second frame corresponding to the portion of the first frame, and communicating the encoded portion of the second frame to the device.

20 Claims, 13 Drawing Sheets

(56) References Cited

U.S. PATENT DOCUMENTS

| | | | |
|---|---|---|---|
| 2012/0216121 A1* | 8/2012 | Lin | H04N 21/234327 |
| | | | 715/721 |
| 2017/0053675 A1* | 2/2017 | Dickerson | G11B 27/102 |
| 2017/0255372 A1* | 9/2017 | Hsu | G06F 3/0485 |
| 2017/0310945 A1* | 10/2017 | Juang | G06T 7/593 |
| 2018/0052595 A1* | 2/2018 | Parmar | G06F 3/04847 |
| 2018/0095616 A1* | 4/2018 | Valdivia | H04L 51/16 |
| 2018/0115807 A1* | 4/2018 | Todorovic | H04N 7/148 |
| 2018/0174619 A1* | 6/2018 | Roy | G11B 27/102 |
| 2018/0302604 A1* | 10/2018 | Zhou | H04L 65/607 |
| 2018/0357245 A1* | 12/2018 | Garg | G06T 13/80 |

OTHER PUBLICATIONS

Hindmarsh, Jon et al., "Object-Focused Interaction in Collaborative Virtual Environments", ACM Transactions on Computer-Human Interaction, vol. 7, No. 4, Dec. 2000, pp. 477-509, XP058082750.
International Search Report and Written Opinion for International Application No. PCT/US2018/064912, dated Apr. 2, 2019, 15 pages.

* cited by examiner

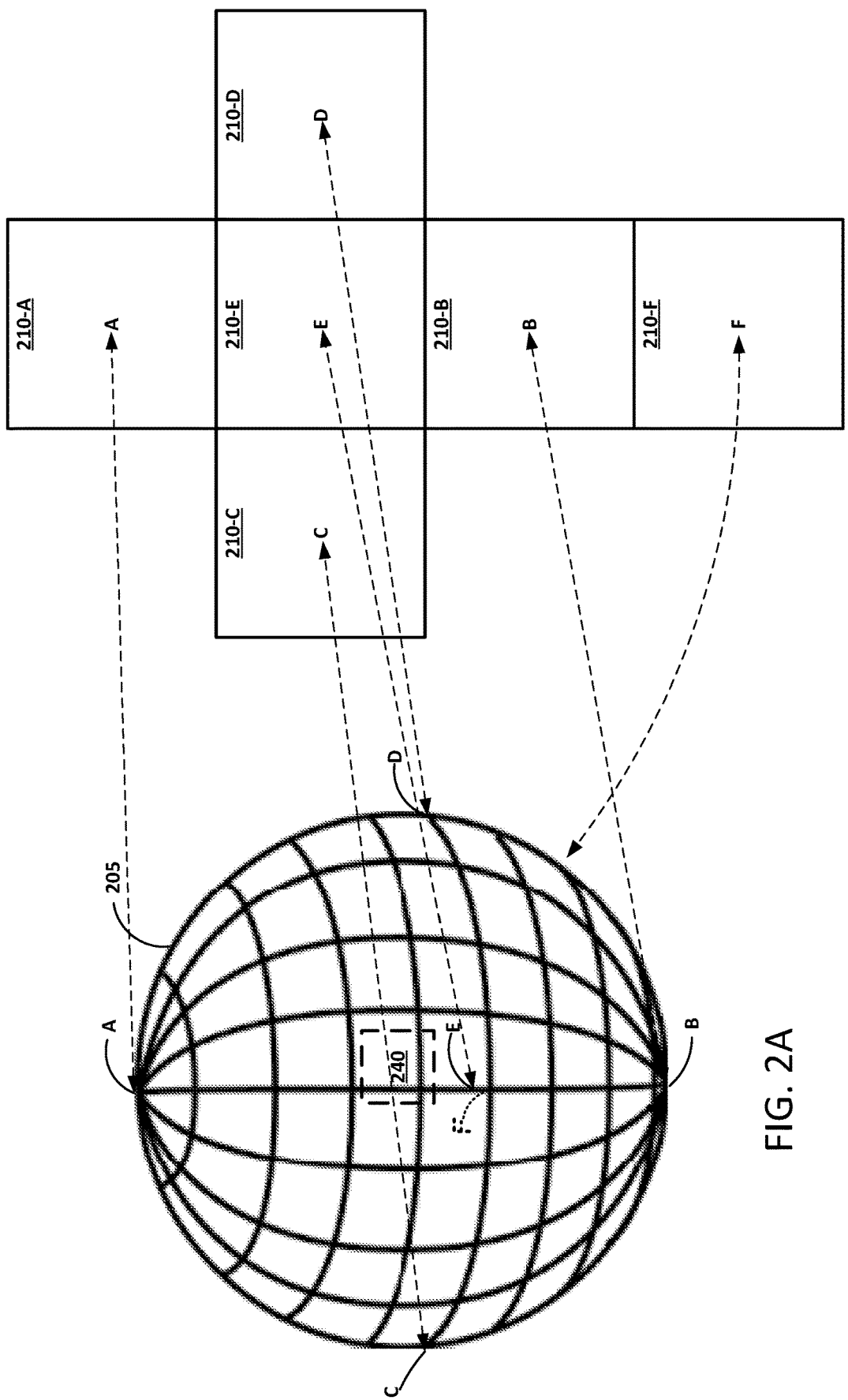

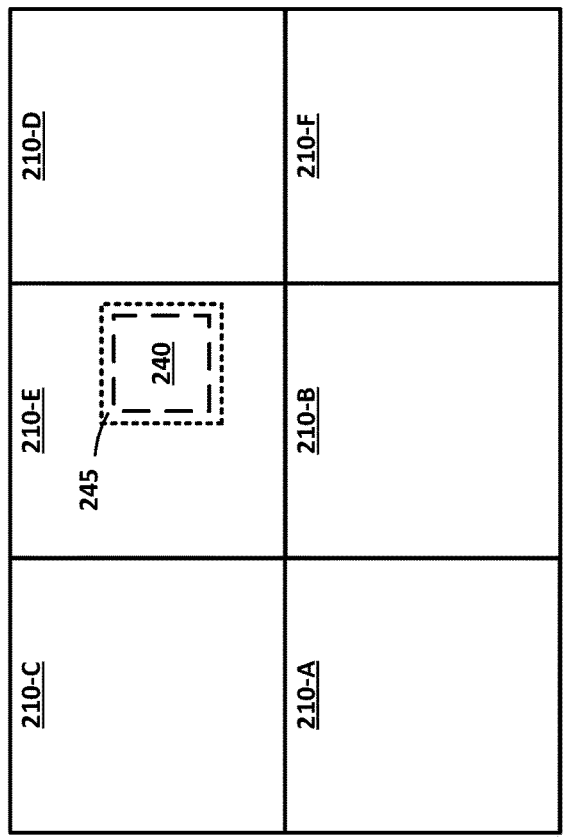
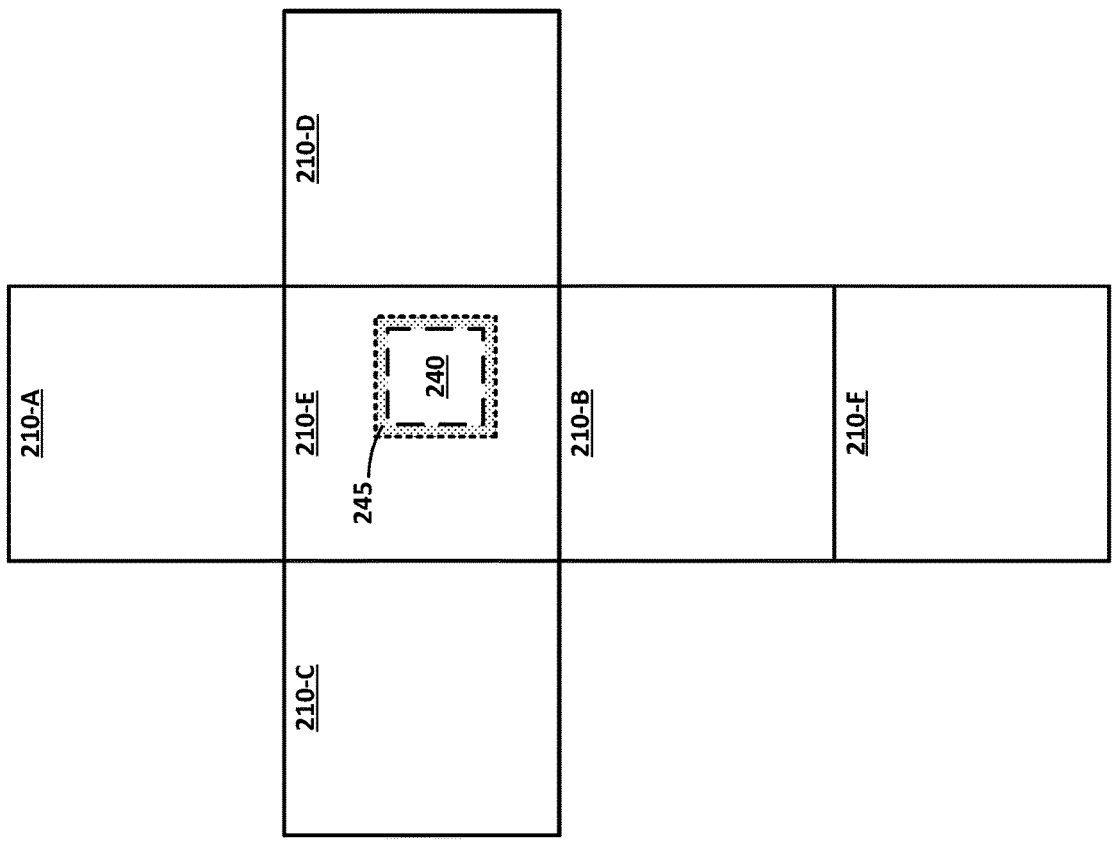
FIG. 2D
FIG. 2C

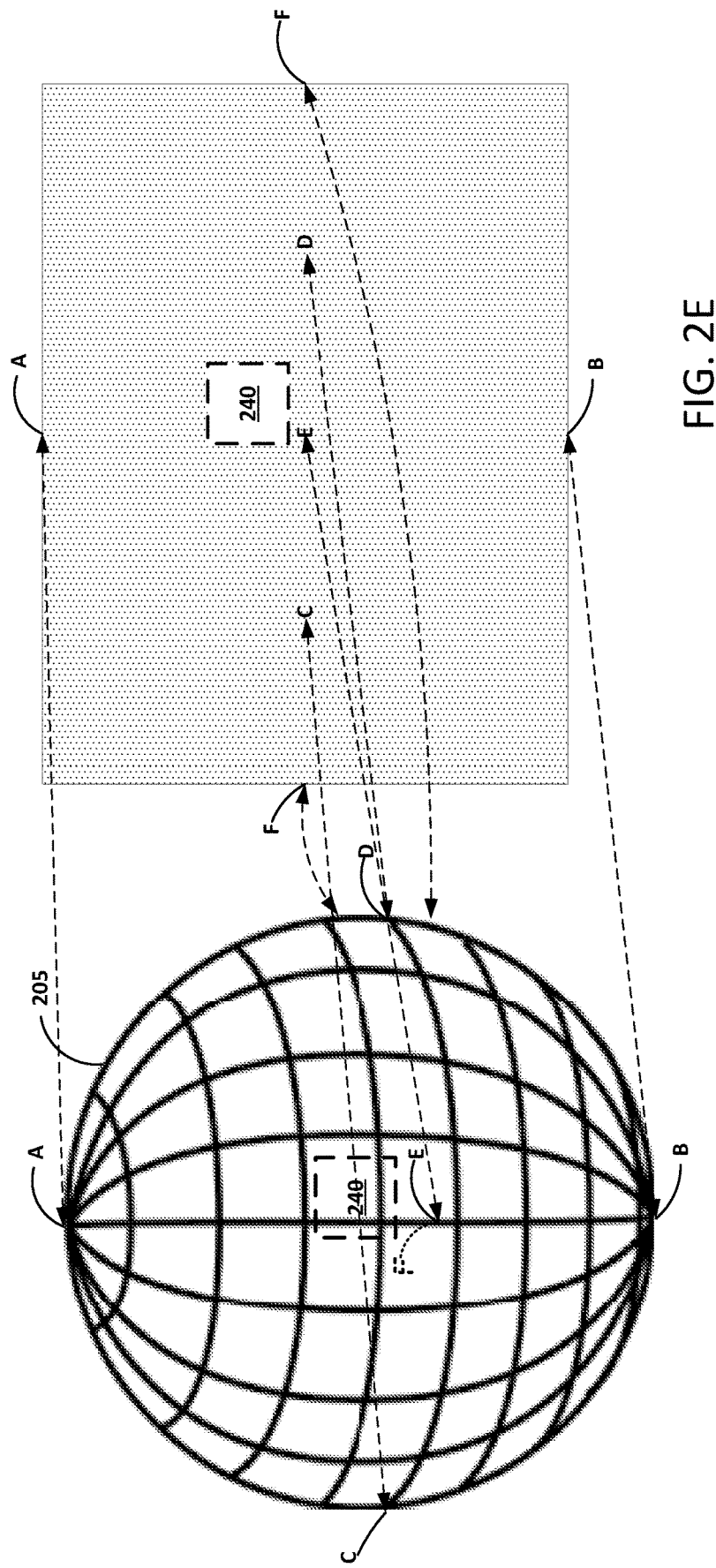

DISTORTION OF VIDEO FOR SEEK IN 360 DEGREE VIDEO

FIELD

Embodiments relate to rendering a 360 degree streaming video during a seek operation.

BACKGROUND

Typically, a streaming server encodes a two dimensional (2D) representation of a 360 degree video and communicates a portion of the encoded 2D representation to a device capable of rendering 360 degree video. Alternatively (or in addition), the streaming server encodes a three dimensional (3D) video representation of a 360 degree video. In one case encompassing two separate 2D views (one for each eye) or volumetric video is encoded and communicated, or another case where 2D or stereo video that includes depth information is encoded and communicated. The device then decodes the 2D (or 3D) representation, converts the decoded 2D representation to 360 degree video and renders the portion of the 360 degree video.

SUMMARY

Example embodiments describe techniques for encoding, decoding and streaming video during a seek operation. In a general aspect, a method includes receiving, from a device displaying a portion of a first frame of a streaming 360 degree video, an indication that a seek operation is triggered, the portion of the first frame being based on a view point of a user of the device, selecting a second frame of the streaming 360 degree video based on the seek operation, encoding a first portion of the second frame and a second portion of the second frame, the first portion of the second frame corresponding to the portion of the first frame, and communicating the encoded portion of the second frame to the device.

In another general aspect, a content server includes a controller and an encoder. The controller is configured to receive, from a device rendering a first portion of a first frame of a streaming 360 degree video, an indication that a seek operation is triggered, the portion of the frame being based on a view point of a user of the device, select a second frame of the streaming 360 degree video based on the seek operation, and communicate an encoded second frame to the device. The encoder is configured to encode a first portion of the second frame and a second portion of the second frame, the first portion of the second frame corresponding to the portion of the first frame.

In yet another general aspect, a non-transitory computer-readable storage medium having stored thereon computer executable program code which, when executed on a computer system, causes the computer system to perform steps that include receiving, from a device displaying a portion of a first frame of a streaming 360 degree video, an indication that a seek operation is triggered, the portion of the first frame being based on a view point of a user of the device, selecting a second frame of the streaming 360 degree video based on the seek operation, encoding a first portion of the second frame and a second portion of the second frame, the first portion of the second frame corresponding to the portion of the first frame, and communicating the encoded portion of the second frame to the device.

Implementations can include one or more of the following features. For example, the second portion of the second frame can extend outward from the center of the first portion of the second frame and begins at a boundary of the first portion of the second frame. The seek operation is one of a fast forward operation or a review operation. The selecting of the second frame based on the seek operation can include determining if the seek operation is a fast forward operation, and in response to determining the seek operation is a fast forward operation, select a subsequent frame of the 360 degree video going forward in order as the second frame.

For example, the selecting of the second frame based on the seek operation can include determining if the seek operation is a review operation, and in response to determining the seek operation is a review operation, select a previous frame of the 360 degree video going forward in order as the second frame. The encoding of the first portion of the second frame and the second portion of the second frame includes encoding the second frame at a framerate based on a seek speed of the seek operation. The steps can further include encoding the portion of the first frame of the streaming 360 degree video using a projection technique, and communicating the encoded first frame to the device. The encoding of the second frame can include centering the first portion of the second frame based on the view point, projecting the second frame using the projection technique, and adding the second portion around the centered first portion.

The steps can further include encoding the portion of the first frame of the streaming 360 degree video using a first projection technique, and communicating the encoded first frame to the device, where the encoding of the second frame includes encoding the second frame using a second projection technique. The steps can further include receiving, from the device during the seek operation, an indication that the view point has changed and encoding the second frame of the streaming 360 degree video based on the changed view point. The steps can further include receiving, from the device during the seek operation, an indication that the view point has changed, encoding the second frame of the streaming 360 degree video based on the changed view point, receiving, from the device during the seek operation, an indication that a playback operation is triggered, encoding a portion of a third frame of the streaming 360 degree video based on the changed view point, and communicating the encoded third frame to the device.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein:

FIG. 2A illustrates a frame of a 360 degree video according to at least one example embodiment.

FIG. 2B illustrates a block diagram of a 2D cubic representation of a frame of a 360 degree video according to at least one example embodiment.

FIG. 2C illustrates a portion of a frame within the block diagram of the 2D cubic representation.

FIG. 2D illustrates the portion of the frame within a rearranged block diagram of the 2D cubic representation.

FIG. 2E illustrates a block diagram of a 2D representation of a frame of a 360 degree video according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Figure 1:
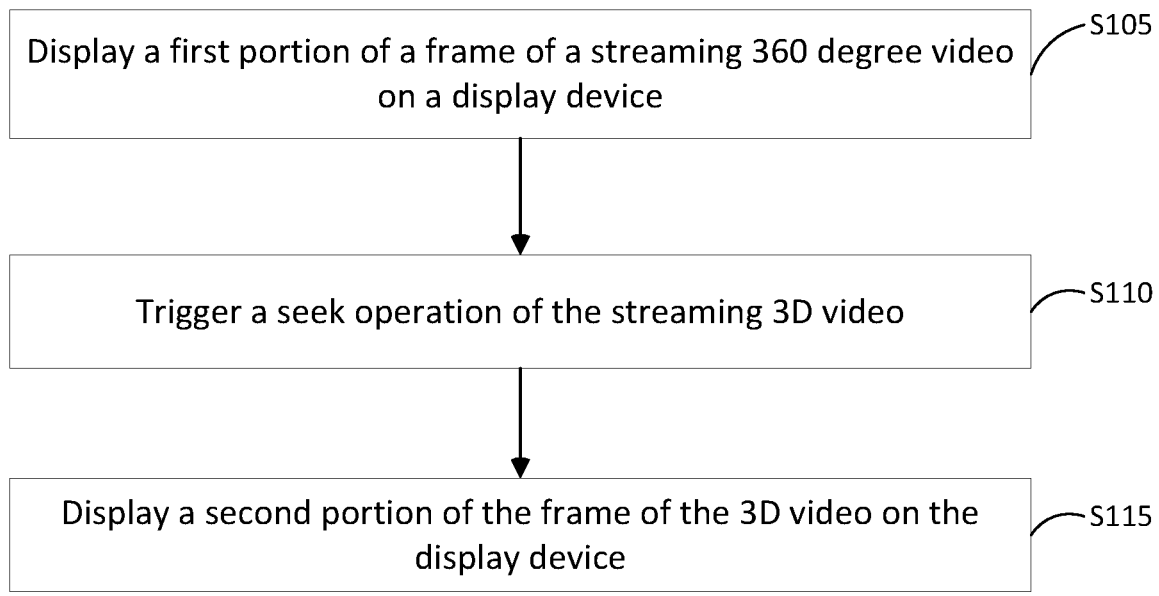
FIG. 1 is a flowchart of a method for displaying a streaming 360 degree video frame according to at least one example embodiment.

FIG. 1 is a flowchart of a method for displaying a streaming 360 degree video frame according to at least one example embodiment. As shown in FIG. 1, in step S105, a first portion of a frame of a streaming 360 degree video is displayed on a display device. The video can be a virtual reality (VR) video, a 360 degree video, a panoramic video, a 180 degree video and the like. Henceforth, the video may be referred to as a video or a 360 degree video. For example, a portion of a frame of the 360 degree video can be displayed on a virtual reality (VR) headset during a playback operation.

In step S110, display of a seek operation of the streaming 360 degree video is triggered. For example, a user of the VR headset can use a control device to trigger a seek operation as a fast forward or review operation on the 360 degree video. A seek operation can cause the display of a series of frames of the 360 degree video at a framerate that is faster than the framerate of the playback (e.g., normal playback) operation. Accordingly, a seek operation can include a fast forward operation that can cause the display of a series of subsequent frames of the 360 degree video going forward in order at a framerate that is faster than the framerate of the playback operation. Further, a seek operation can include a review operation that can cause the display of a series of previous frames of the 360 degree video going backward in order at a framerate that is faster than the framerate of the playback operation.

In step S115, a first portion and a second portion of a second frame of the 360 degree video is displayed on the display device based on the seek operation, the first portion of the second frame corresponding to the portion of the first frame. The second frame can be one of the series of frames of the 360 degree video that is displayed at a framerate that is faster than the playback operation. For example, the second frame can be selected from one of the subsequent frames of the 360 degree video that is associated with the fast forward operation or one of the previous frames of the 360 degree video that is associated with the review operation. In this example, more (e.g., the second portion) of the frame of the 360 degree video is displayed than that which is displayed during the playback operation (e.g., the first portion of the frame).

For example, during a playback of a 360 degree video a user of the VR headset sees only a portion of the 360 degree video based on a view point of the user (described in more detail below). Therefore, some portions (likely a majority) of the 360 degree video are not displayed and not seen by the user. In some implementations these portions of the 360 degree video are not encoded or communicated to the VR headset (or a computing device associated with VR headset). As such during a seek operation the user of the VR headset may miss some video element of interest because the video of interest is outside (e.g., not included in a range of) the view point of the user.

Therefore, in addition to the first portion of the frame, example embodiments display a second portion of the second frame of the 360 degree video. Displaying the second portion of the second frame of the 360 degree video includes displaying 360 degree video that is outside (e.g., not included in a range of) the view point of the user during playback (e.g., normal playback) operation. For example, a portion of the 360 degree video that is behind a user in the VR environment that is not displayed during the playback operation can be displayed during the seek operation. In an example implementation, the portion of the 360 degree video that is behind a user in the VR environment can be displayed peripherally (e.g., such that the user sees the portion in her peripheral vision).

In another implementation, a two dimensional (2D) image projection of the seek frame of the 360 degree video can be generated (e.g., as a fisheye projection). As a result, the user of the VR headset should not miss some video element of interest because the video element of interest can be displayed during the seek operation.

Therefore, if the user of the VR headset sees some video element of interest the user can change her focus to the video element of interest causing the view point to change which triggers a change what video is displayed. Further, the user can continue in the seek operation with the first portion of the frame and the second portion of the frame of the 360 degree video being displayed based on the new view point. The user could also switch to the playback operation and a portion of the frame is displayed based on the new view point.

Prior to communicating a frame (or portion of a frame) of 360 degree video, the frame of 360 degree video can be projected into a two-dimensional (2D) representation of the frame of 360 degree video. In other words, during an encoding process, the frame of the 360 degree video can be projected or mapped to a two-dimensional (2D) representation (thus allowing 2D encoding techniques to be used). The projection can be rectangular, cylindrical, cubic or the like. The projection can be hemispherical fisheye, angular fisheye, equirectangular, Mercator, Gaussian, Peirce quincuncial, elliptical, hyperelliptical and the like. The first portion of the frame and the second portion of the frame (discussed above) can be selected from the 2D representation of the 360 degree video.

FIG. 2A illustrates a frame of a 360 degree video according to at least one example embodiment. As shown in FIG. 2A, the sphere 205 represents a frame of a 360 degree video and a portion of the frame of the 360 degree video 240 representing a portion of the frame of 360 degree video that would be seen by a viewer of the 360 degree video based on a view point of the viewer. The portion of the frame of the 360 degree video 240 can be selected based on an indication of a view point of the user as received from a viewing device (e.g., a VR headset). The view point can be determined as a position, point or focal point on the 360 degree video. For example, the view point could be a latitude and longitude position on the 360 degree video. Accordingly, if the user is looking at a point centered in portion 240, the indication of the view point can be a latitude and longitude position on the sphere 205.

The portion of the frame of the 360 degree video 240 representing a portion of the frame of 360 degree video may be a portion of the sphere 205 as viewed from the inside of the sphere 205 looking outward. The portion of the frame of the 360 degree video 240 representing a portion of the frame of 360 degree video may be a portion of the sphere 205 as viewed from the inside of the sphere 205 looking outward. The portion of the frame of the 360 degree video 240 representing a portion of the frame of 360 degree video may also be a portion of the sphere 205 as viewed from the outside of the sphere 205 looking toward the center of the sphere 205.

FIG. 2B illustrates a block diagram of a 2D cubic representation of a frame of a 360 degree video according to at least one example embodiment. This is one example implementation of a projection technique, other projection techniques are within the scope of the scope of this disclosure (a portion of which are referenced above). As shown in FIG. 2B, the 2D cubic representation has six (6) cube faces 210-A, 210-B, 210-C, 210-D, 210-E, 210-F. In the example of FIG. 2B, pole A can be mapped or projected to the center of cube face 210-A, pole B can be mapped or projected to the center of cube face 210-B. Further, equidistant positions along the equator of the sphere 205 can be mapped to the remaining cube faces. For example, point C can be mapped or projected to the center of cube face 210-C, point D can be mapped or projected to the center of cube face 210-D, point E can be mapped or projected to the center of cube face 210-E, and point F (directly opposite of point E, on the back side of the sphere 205, if the sphere 205 were illustrated in three dimensions (3D)) can be mapped or projected to the center of cube face 210-F. Then a portion of the sphere 205 surrounding each pole A, pole B, point A, point B, point C, and point D can be mapped to the remainder of the corresponding cube face.

FIG. 2C illustrates a portion of a frame within the block diagram of the 2D cubic representation. Typically a streaming device encodes a portion of the frame of the 360 degree video and communicates the encoded portion to the viewing device (via any number of intervening nodes. In other words, a streaming device maps the 360 degree video frame to the 2D cubic representation, selects the portion of the frame of the 360 degree video (e.g., portion of the frame of the 360 degree video 240), encodes the portion of the frame of the 360 degree video and communicates the encoded portion of the frame of the 360 degree video to a viewing device. The encoded portion can include a buffer area 245. The buffer area can be configured to allow small movement of the VR headset without requesting additional video.

This process is repeated over and over for each frame of the 360 degree video as the frame is streamed. When a seek operation is triggered, this process is repeated over and over for each frame at a higher framerate based on a seek speed or framerate. For example, the seek speed or framerate can be 2 times normal playback speed, 4 times normal playback speed, 8 times normal playback speed, 16 times normal playback speed, sometimes referred to as ×2, ×4, ×8, ×16, and the like.

However, according to an example implementation, the streaming device can stream a whole frame of the 360 degree video instead of a portion of the frame of 360 degree video. For example, if during the playback operation the portion of the frame of the 360 degree video 240 is streamed to the viewing device a seeking operation is triggered, a subsequent frame include a larger portion (as compared to normal playback) of the sphere 205 (e.g., larger than portion 240 and buffer 245). In example implementation, a percentage (e.g., 50%, 60% and the like) of the cube face 210-E can be streamed, a cube face 210 can be streamed, two or more cube faces can be streamed, each of the cube faces can be streamed. For example, the cube face (e.g., cube face 210-E) including the portion of the frame of the 360 degree video 240 can be in the center of the frame with one or more cube faces positioned around it. FIG. 2D illustrates the portion of the frame within a rearranged block diagram of the 2D cubic representation. In this example, all of the cube faces are included. However, example implementations are not limited thereto.

FIG. 2E illustrates a block diagram of a 2D representation of a frame of a 360 degree video according to at least one example embodiment. In another implementation, a different projection technique can be used during the seeking operation. For example, a fisheye or a Peirce quincuncial projection can be used during the seek operation. In some implementations, the sphere 205 can be repositioned (e.g., rotated, translated or the like) during encoding such that the portion 240 will be in the field of view of the user of the viewing device when rendered on the viewing device. In addition (or alternatively), the sphere 205 can be repositioned to minimize an amount of distortion of the portion 240 caused by the projection technique used during the seeking operation. A portion (e.g., the first portion and/or the second portion) can be selected from the 2D representation.

Figure 3:
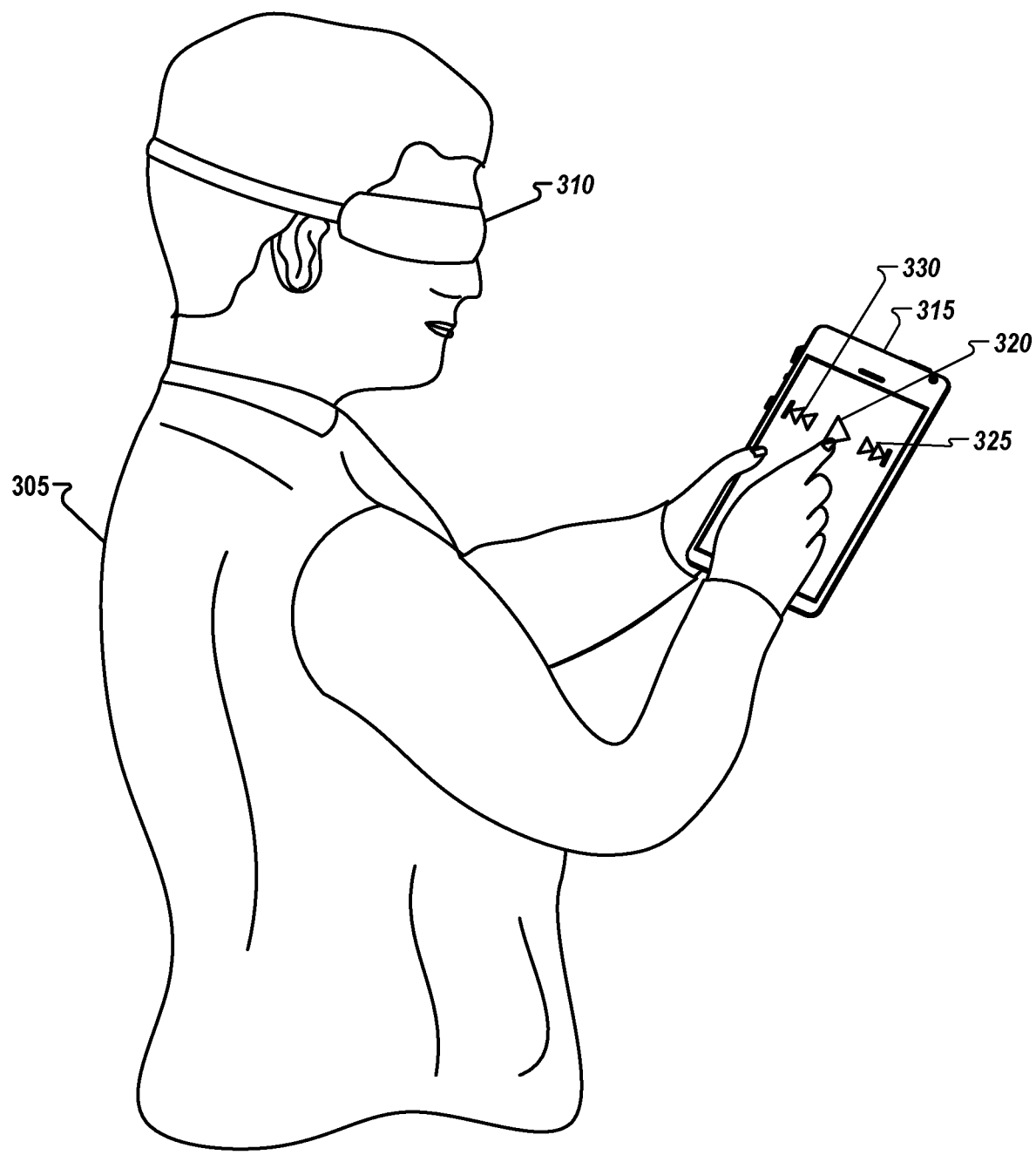
FIG. 3 illustrates a user interacting with a control device.

FIG. 3 illustrates a user interacting with a control device. As shown in FIG. 3, user 305 can be viewing a 360 degree video, interacting with a VR environment that includes a 360 degree video or the like using headset 310. The 360 degree video, interacting with a VR environment that includes a 360 degree video or the like can be controlled using control device 315. The control device 315 includes an interface with control 320, control 325 and control 320. Control 320 can be configured to trigger a playback operation for the 360 degree video. Control 325 can be configured to trigger a fast forward operation for the 360 degree video. Control 330 can be configured to trigger a review operation for the 360 degree video.

Figure 9B:
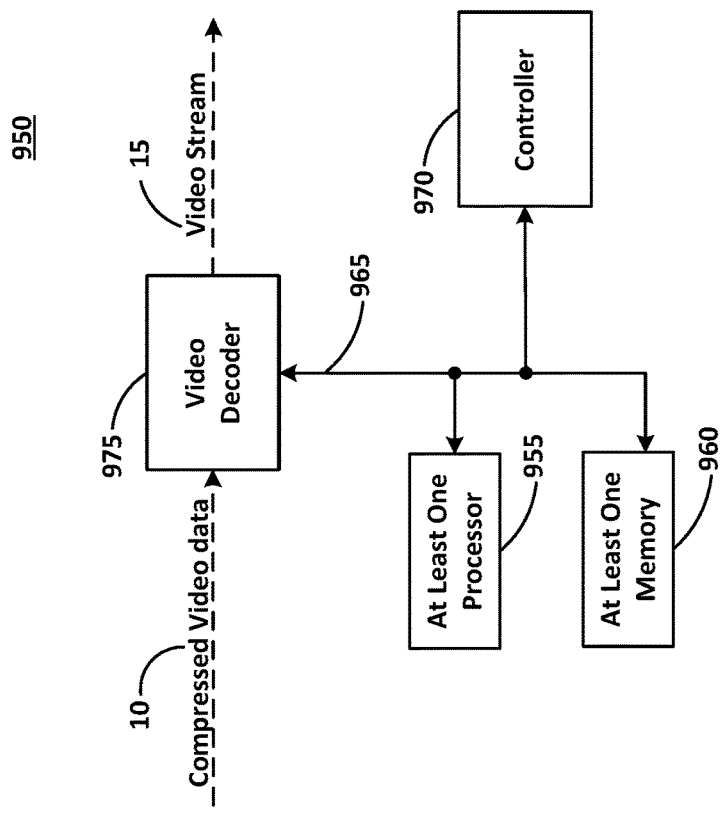
FIG. 9B illustrates a video decoder system according to at least one example embodiment.
Figure 9A:
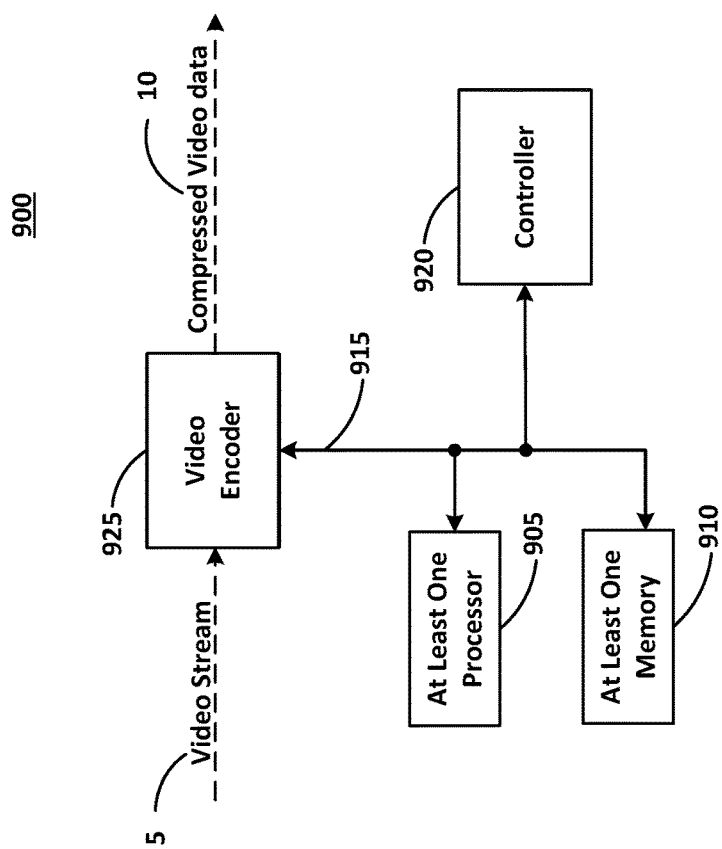
FIG. 9A illustrates a video encoder system according to at least one example embodiment.

FIGS. 1 and 4-7 are flowcharts of methods according to example embodiments. The steps described with regard to FIGS. 1 and 4-7 may be performed due to the execution of hardware module or software code stored in a memory (e.g., at least one memory 710. 760) associated with an apparatus (e.g., as shown in FIGS. 9A and 9B) and executed by at least one processor (e.g., at least one processor 905, 955) associated with the apparatus. However, alternative embodiments are contemplated such as a system embodied as a special purpose processor. Although the methods described below are described as being executed by a processor, the methods (or portions thereof) are not necessarily executed by a same processor. In other words, at least one processor may execute the methods described below with regard to FIGS. 1 and 4-7.

Figure 4:
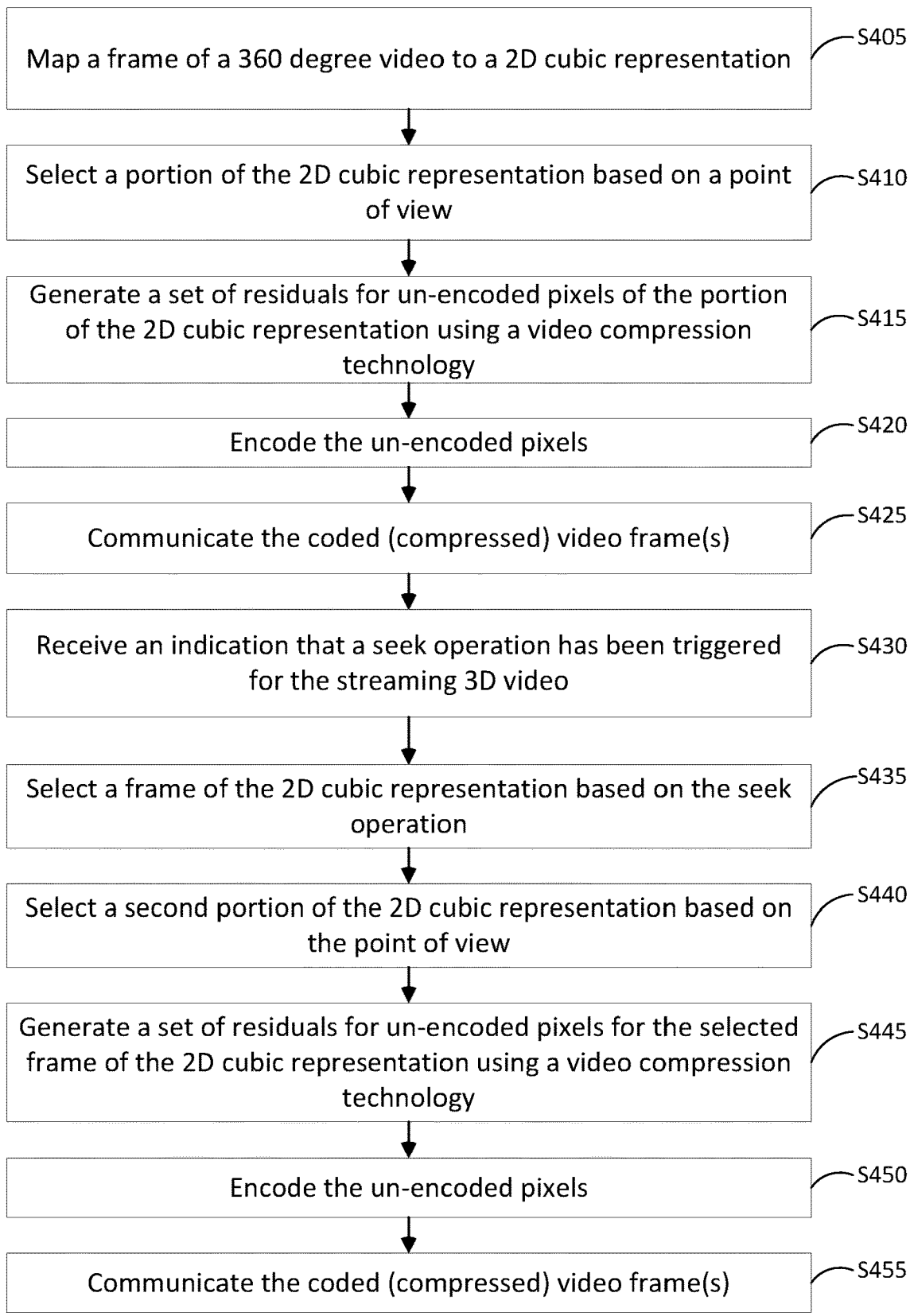
FIGS. 4, 5, 6 and 7 are flowcharts of a method for encoding/decoding a video frame according to at least one example embodiment.
Figure 5:
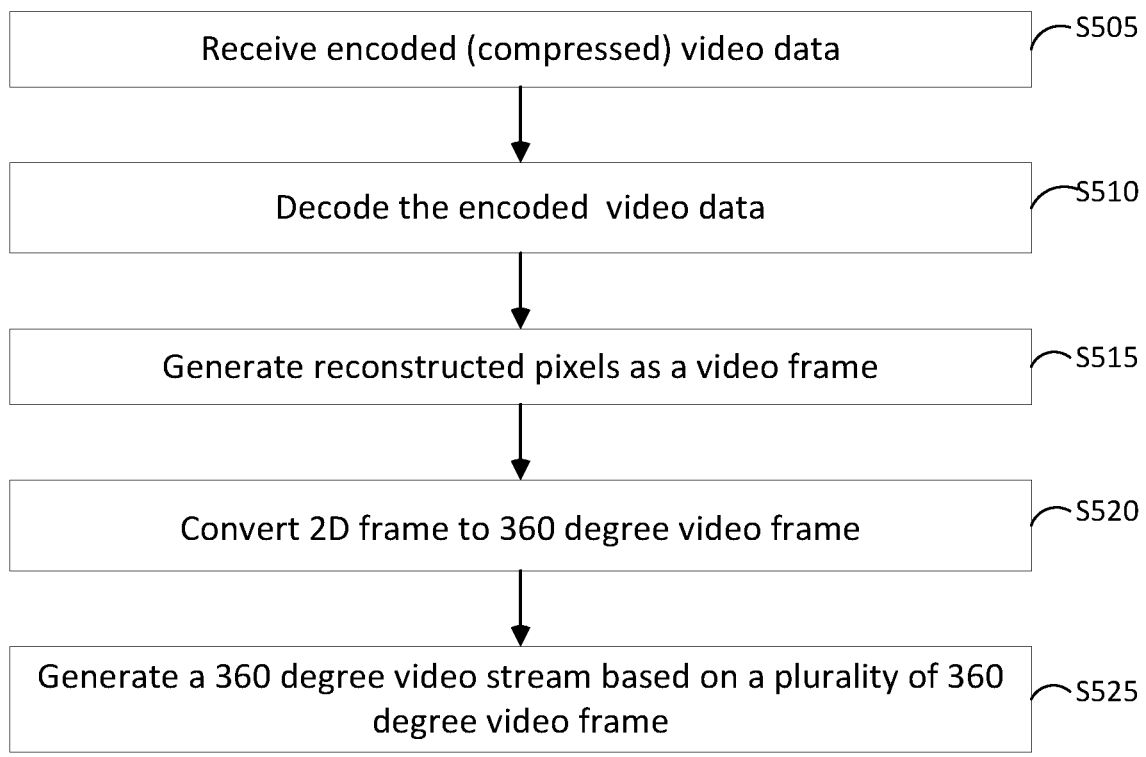
Figure 6:
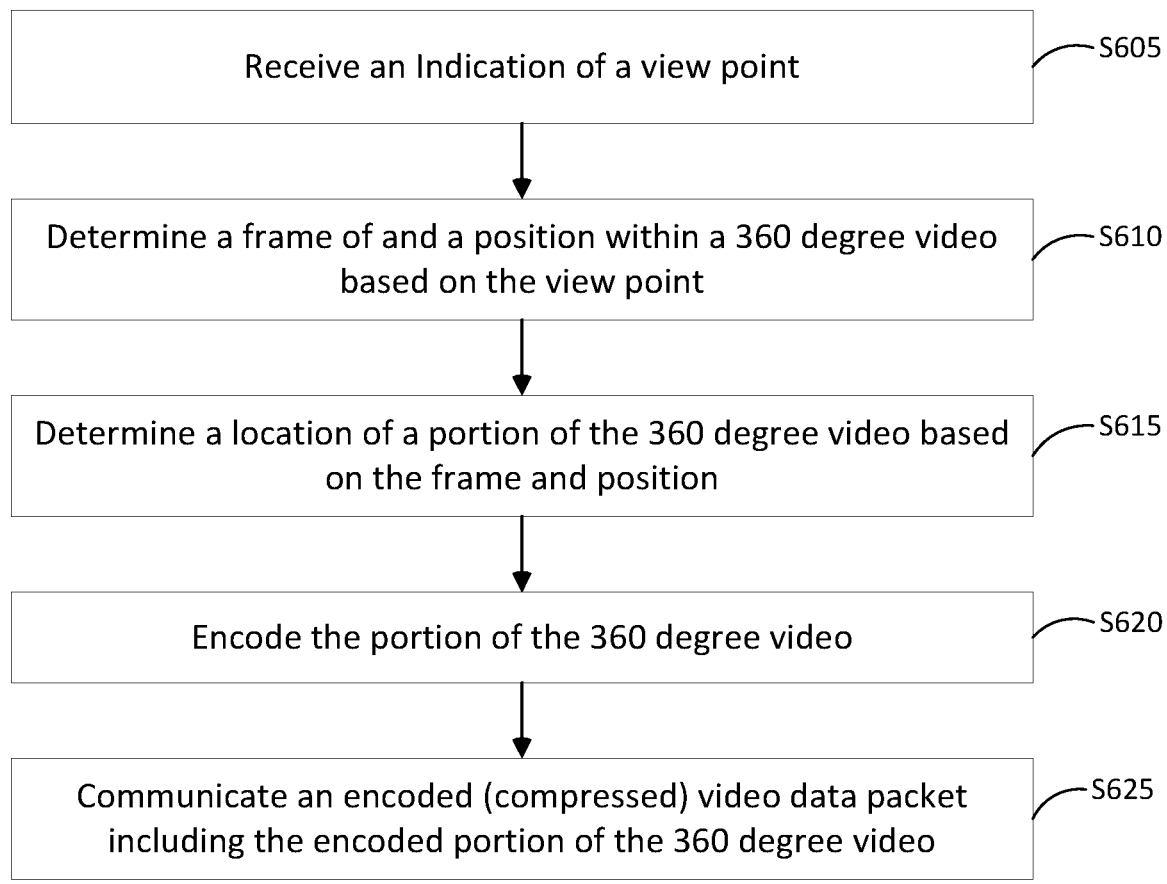

FIGS. 4-6 are flowcharts of methods for encoding/decoding a streaming video frame according to at least one example embodiment. FIG. 4 is a flowchart of a method for encoding a streaming 360 degree video frame according to at least one example embodiment. As shown in FIG. 4, in step S405 a frame of a 360 degree video is mapped to a 2D cubic representation. For example, FIG. 2B illustrates the sphere 205 illustrated in FIG. 2A as a 2D cubic representation. The mapping can include mapping the frame of a 360 degree video to a 2D representation based on a spherical to square projection. In this example, the 2D representation can be a plurality of squares each representing a face of a cube. The sphere 205 can be projected onto each square in the 2D representation using a quadrilateralized spherical cube projection algorithm or curvilinear projection.

The sphere 205 can be translated such that a portion of the frame of the 360 degree video to be encoded (e.g., based on a view point of a viewing device 115-1, 115-2, 115-3) is advantageously positioned at a center of a face 210, 215, 220, 225, 230, 235 of the cube. For example, sphere 205 can be translated such that a center of the portion of the frame of the 360 degree video 240 could be positioned at pole A (pole B, point C, point D, point E, or point F). Then, the portion of the frame of the 360 degree video (and subsequently each frame of the streaming 360 degree video while portion 240 is selected) associated with face 230 is mapped to the 2D cubic representation. Face 230 is subsequently encoded.

In step S410 a first portion of the 2D cubic representation is selected based on a point of view. For example, the portion of the 2D cubic representation can be one of portion 240, 234, 250, 255, 260, 265. The portion of the 2D cubic representation can be selected based on an indication of a view point of the user as received from a viewing device (e.g., a VR headset). The view point can be determined as a position, point or focal point on the 360 degree video. For example, the view point could be a latitude and longitude position on the 360 degree video. Accordingly, if the user is looking at a point centered in portion 240, the indication of the view point can be a latitude and longitude position on the sphere 205.

In step S415 a set of residuals for un-encoded pixels of the portion of the 2D cubic representation of the video sequence frame is generated using a video compression technology. For example, at least one value associated with each pixel may be subtracted from a corresponding value associated with a corresponding block of the selected based on the video compression technology.

In step S420 the un-encoded pixels are encoded. For example, the generated residual pixels may be transformed (encoded or compressed) into transform coefficients using a configured transform (e.g., a KLT, a SVD, a DCT or an ADST). The transformed coefficients can then be quantized through any reasonably suitable quantization techniques. In addition, entropy coding may be applied to, for example, assign codes to the quantized motion vector codes and residual error codes through any entropy coding technique.

In step S425 the coded (compressed) video frame(s) are communicated. For example, the controller 920 may output the coded video (e.g., as coded video frames) to one or more output devices. The controller 920 may output the coded video as a single motion vector and a single set of predictor values (e.g., residual errors) for the macroblock. The controller 920 may output information indicating the video compression technology used in intra-prediction and/or an inter-prediction coding by the encoder 925. For example, the coded (compressed) video frame(s) may include a header for transmission. The header may include, amongst other things, the information indicating the video compression technology used in coding by the encoder. The video compression technology may be communicated with the coded (compressed) video frame(s) (e.g., in the header). The communicated video compression technology may indicate parameters used to convert each frame to a 2D cubic representation. The communicated coding scheme or mode may be numeric based (e.g., mode 101 may indicate a quadrilateralized spherical cube projection algorithm).

In step S430 an indication that a seek operation has been triggered for the streaming 360 degree video is received. For example, the user 305 of the VR headset 310 can use the control device 315 to trigger a seek operation using control 325 as a fast forward trigger or control 325 as a review trigger. Controller 970 can then communicate the indication to controller 920. The indication can include a seek operation type (e.g., fast forward or review), a seek speed or framerate (e.g., ×2, ×4, ×8, ×16, and the like), a point of view (e.g., if there is a change in the point of view) and/or any other information related to a seek operation.

In step S435 a frame of the 2D cubic representation is selected based on the seek operation. For example, a fast forward seek operation type can cause the selection of at least one subsequent frame of the 360 degree video and a review seek operation type can cause the selection of at least one previous frame of the 360 degree video. For example, if during the playback operation the portion of the frame of the 360 degree video 240 is streamed to the viewing device a seeking operation is triggered, a selected frame can include the entire sphere 205. In one implementation, each of the cube faces 210, 215, 220, 225, 230, 235 can be configured as the selected frame. For example, the cube face (e.g., cube face 215) including the portion of the frame of the 360 degree video 240 can be in the center of the frame with the remaining cube faces positioned around it, this cube face configuration becomes the selected frame. The cube face configuration may be filled with white, black, and/or some other color pixels to complete the frame. In other words, the cube face configuration may not result in a rectangle (the typical shape of a frame) and white, black, and/or some other color pixels can be used to form a rectangle.

In another implementation, a different projection technique can be used during the seeking operation. For example, a fisheye or a Peirce quincuncial projection can be used during the seek operation. This implementation can be a design choice and/or can be included (e.g., as the other information related to a seek operation) in the indication that a seek operation has been triggered. In this implementation, the frame of the 360 degree video corresponding to the selected frame of the 2D cubic representation is re-projected using the different projection technique. The re-projected frame of the 360 degree video is selected (or replaces) the selected frame of the 2D cubic representation.

In addition, the sphere 205 can be repositioned (e.g., rotated, translated or the like) during encoding such that portion 240 will be in the field of view of the user of the viewing device when rendered on the viewing device. In addition (or alternatively), the sphere 205 can be repositioned to minimize an amount of distortion of the portion 240 caused by the projection technique used during the seeking operation.

In step S440 a second portion of the 2D cubic representation is selected based on the point of view. The second portion can extend outward from (or away from) the center of the first portion and begin at a boundary of the first portion (or at a boundary of a buffer for the first portion). The second portion can be larger or significantly larger than the first portion. The second portion can be a percentage larger or a percentage in addition to the first portion. The second portion can include the first portion. The second portion can be a face of a 2D cubic representation. The second portion can be two or more faces of a 2D cubic representation. The second portion can be a 2D rectangular representation. The second portion can be all of the 2D cubic representation. The second portion can be all of a rectangular representation selected based on the 2D cubic representation.

In step S445 a set of residuals for un-encoded pixels of the selected frame of the 2D cubic representation are generated using the video compression technology. The set of residuals can be selected from the first portion and/or the second portion of the 2D representation. For example, at least one value associated with each pixel may be subtracted from a corresponding value associated with a corresponding block of the selected based on the video compression technology.

In step S450 the un-encoded pixels are encoded. For example, the generated residual pixels may be transformed (encoded or compressed) into transform coefficients using a configured transform (e.g., a KLT, a SVD, a DCT or an ADST). The transformed coefficients can then be quantized through any reasonably suitable quantization techniques. In addition, entropy coding may be applied to, for example, assign codes to the quantized motion vector codes and residual error codes through any entropy coding technique.

In step S455 the coded (compressed) video frame(s) are communicated. For example, the controller 920 may output the coded video (e.g., as coded video frames) to one or more output devices. The controller 920 may output the coded video as a single motion vector and a single set of predictor values (e.g., residual errors) for the macroblock. The controller 920 may output information indicating the video compression technology used in intra-prediction and/or an inter-prediction coding by the encoder 925. For example, the coded (compressed) video frame(s) may include a header for transmission. The header may include, amongst other things, the information indicating the video compression technology used in coding by the encoder. The video compression technology may be communicated with the coded (compressed) video frame(s) (e.g., in the header). The communicated video compression technology may indicate parameters used to convert each frame to a 2D cubic representation. The communicated coding scheme or mode may be numeric based (e.g., mode 101 may indicate a quadrilateralized spherical cube projection algorithm).

FIG. 5 is a flowchart of a method for decoding a streaming 360 degree video frame according to at least one example embodiment. As shown in FIG. 5, in step S505 encoded (compressed) video data is received. For example, the encoded (compressed) video data may be a previously encode (e.g., by video encoder 925) 360 degree video stream received via communication network (e.g., Internet or Intranet). The coded (compressed) video frame(s) may include a header. The header may include, amongst other things, the information indicating the video compression technology used in coding by the encoder. For example, the video compression technology may indicate parameters used to convert each frame to a 2D cubic representation.

In step S510 the encoded video data is decoded. For example, the compressed video data can be decoded by entropy decoding to produce a set of quantized transform coefficients. The entropy decoded video data can then be de-quantized by mapping values within a relatively small range to values in a relatively large range (e.g. opposite of the quantization mapping described above). The video decoder can also inverse transform the video bits using an indicated (e.g., in the header) transform (e.g., a KLT, a SVD, a DCT or an ADST) to generate a set of residuals.

In step S515 reconstructed pixels are generated as a video frame. For example, the video decoder may add a residual (e.g., transformed or decompressed video data) to the corresponding position in a video data block selected based on a video compression technology resulting in a reconstructed pixel. Then a set of reconstructed pixels can be organized as a reconstructed block of the video frame. A plurality of reconstructed blocks can then be organized as the video frame. In addition, a loop filter can be applied to the reconstructed block to reduce blocking artifacts. For example, a deblocking filter can be applied to the reconstructed block to reduce blocking distortion.

In step S520 the 2D frame is converted to a 360 degree video frame. For example, the 2D frame can be converted using the inverse of the technique described above with regard to mapping a 360 degree video frame to a 2D representation. In step S525 a 360 degree video stream is generated based on a plurality of 360 degree video frame. For example, at least two video frames of reconstructed converted frames may be organized in a sequence to form a 360 degree video stream. The 360 degree video stream can be rendered using headset 310.

FIG. 6 is a flowchart of a method for encoding a streaming 360 degree video frame according to at least one example embodiment. As shown in FIG. 6, in step S605 an indication of a view point is received. For example, the indication of the view point can be received from a device executing a playing back of the 360 degree video (e.g., a device associated with or coupled to headset 310). In other words, the indication of the view point can be received from a device implementing a decoder (e.g., decoder 975 when implemented in a device associated with or coupled to headset 310) in order for a viewer to view the 360 degree video using a device associated with or coupled to headset 310. For example, the indication of a view point can be based on a portion of a 360 degree video that a viewer is currently looking at (e.g., portion 240 or the center of portion 240). The indication can be, for example, a point (e.g., the center of portion 240) or position (e.g., longitude and latitude) on the sphere 205, a plurality of points on the sphere, or a side of a cube representing the sphere 205.

In an example implementation, the indication of a view point is received before the 360 degree video frame is mapped to a 2D cubic representation. In this implementation, the 360 degree video frame can be rotated such that the view point is centered along, for example, a pole (e.g., pole A or the line at the center of the sphere 205 (e.g., along the equator). As a result, the pixels, blocks and/or macro-blocks (e.g., that make up the portion of the 360 degree video) can be in a position such that any distortion of the pixels, blocks and/or macro-blocks during a projection of the pixels, blocks and/or macro-blocks onto the surface of the cube can be minimized, e.g., through rotation the 360 degree video to align with a 2D projected surface (such as a cube map).

In step S610 a frame of and a position within a 360 degree video based on the view point is determined. For example, if the indication is a point or position (e.g., the center of portion 240) on the sphere (as a 360 degree video frame), a number of pixels, a block and/or a macro-block can be determined based on the view point. In an example implementation, the position can be a centered on the point (e.g., the center of portion 240) or position. The frame can be a next frame in the stream during a playback operation, a subsequent frame during a seek (fast forward) operation or a previous frame during a seek (review) operation. However, in some implementations, frames can be queued on the viewing device (e.g., headset 310). Therefore, a number of frames in the queue may need to be replaced when the viewer changes a view point. Therefore, the determined frame can be a frame (e.g., first frame to be replaced) in the queue.

In step S615 a location of a portion of the 360 degree video based on the frame and position is determined. For example, within the selected frame, a portion of the 360 degree video can include a plurality of pixels or blocks of pixels. In one implementation, the portion of the 360 degree video can be generated based on the view point to include the plurality of pixels or blocks included in a square or rectangle centered on the view point or determined position. The portion of the 360 degree video can have a length and width based on the viewing device. For example, the length and width of the portion of the 360 degree video can be only what is needed for rendering on the headset 310. However, the length and width of the portion of the 360 degree video can be only what is needed for rendering on the viewing device plus a border region around the portion of 360 degree video. The border region around the portion of 360 degree video can be configured to allow for small deviations in the view point.

As discussed above, during a seek operation the entire selected frame of the 360 degree video is communicated to the viewing device. Therefore, the entire selected frame of the 360 degree video is selected as (or replaces) the portion of the 360 degree video. In this implementation, the frame of the 360 degree video can be rotated and/or translated based on the view point or determined position before the frame of the 360 degree video is encoded. The frame of the 360 degree video can be rotated and/or translated based on a projection technique used by the encoder.

In step S620 the portion of the 360 degree video is encoded. For example, the portion of the 360 degree video may be projected, transformed (encoded or compressed) into transform coefficients using a configured transform (e.g., a KLT, a SVD, a DCT or an ADST). The transformed coefficients can then be quantized through any reasonably suitable quantization techniques. In addition, entropy coding may be applied to, for example, assign codes to the quantized motion vector codes and residual error codes to match code lengths with the probabilities of the quantized motion vector codes and residual error codes, through any entropy coding technique.

In step S625 an encoded (compressed) video data packet including the encoded portion of the 360 degree video is communicated. For example, the controller 920 may output the coded video (e.g., as coded video frames) as one or more data packets to one or more output devices. The packet may include compressed video bits 10. The packet may include the encoded portion of the 360 degree video. The controller 920 may output the coded video as a single motion vector and a single set of predictor values (e.g., residual errors) for the macroblock. The controller 920 may output information indicating the mode or scheme used in intra-prediction and/or an inter-prediction coding by the encoder 925. For example, the coded (compressed) video frame(s) and/or the data packet may include a header for transmission. The header may include, amongst other things, the information indicating the mode or scheme used in coding by the encoder. The coding scheme or mode may be communicated with the coded (compressed) video frame(s) (e.g., in the header). The communicated coding scheme or mode may indicate parameters used to convert each frame to a 2D cubic representation. The communicated coding scheme or mode may be numeric based (e.g., mode 101 may indicate a quadrilateralized spherical cube projection algorithm).

Figure 7:
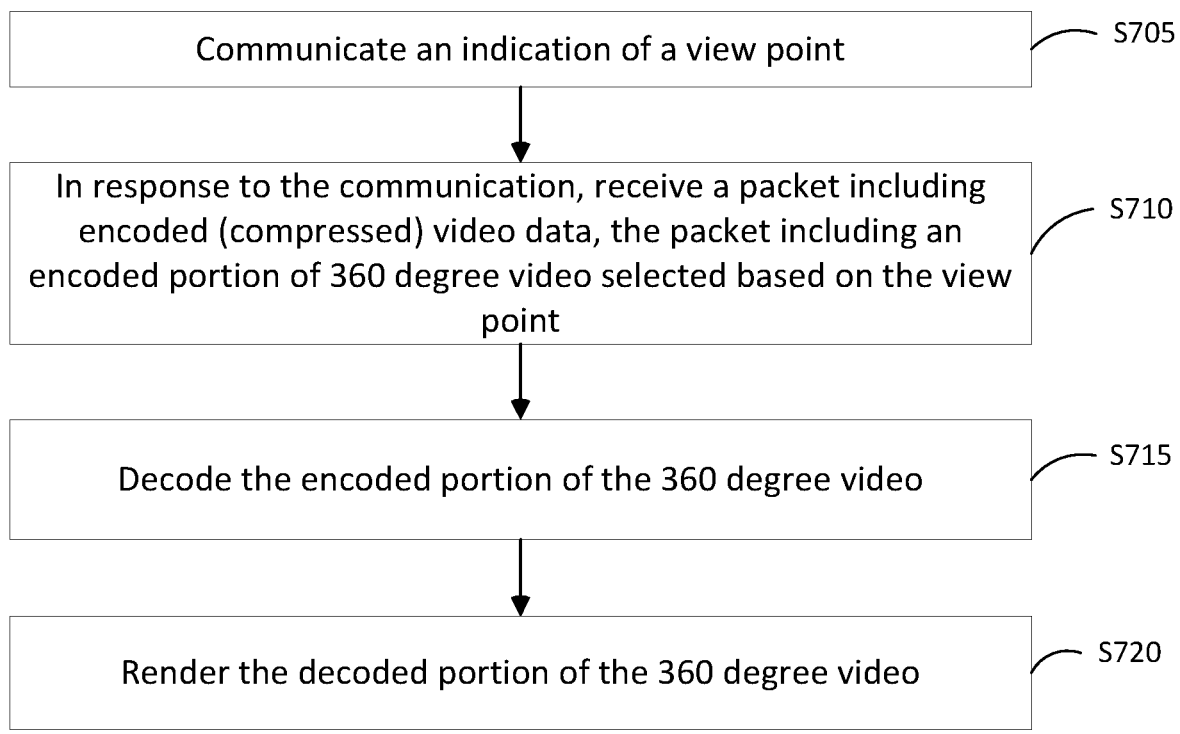

FIG. 7 is a flowchart of a method for decoding a streaming 360 degree video frame according to at least one example embodiment. As shown in FIG. 7, in step S705 an indication of a view point is communicated. For example, the indication of the view point can be communicated by a device executing a playing back of the 360 degree video (e.g., headset 310 or a device associated with or coupled to headset 310). In other words, the indication of the view point can be communicated by a device implementing a decoder (e.g., decoder 975 when implemented in headset 310 or a device associated with or coupled to headset 310) in order for a viewer to view the 360 degree video. For example, the indication of a view point can be based on a portion of a 360 degree video that a viewer is currently looking at (e.g., portion 240 or the center of portion 240). The indication can be, for example, a point (e.g., the center of portion 240) or position (e.g., longitude and latitude) on the sphere 205, a plurality of points on the sphere, a side of a cube representing the sphere 205 or some other position from which the view point can be determined.

In step S710 in response to the communication, a packet including encoded (compressed) video data is received where the packet includes an encoded portion of 360 degree video selected based on the view point. For example, the packet may include compressed video bits 10. The packet may include a header for transmission. The header may include, amongst other things, the information indicating the mode or scheme used in intra-frame and/or inter-frame coding by the encoder. The header may include information indicating parameters used to convert a frame of the 360 degree video to a 2D cubic representation. The header may include information indicating parameters used to achieve a bandwidth or quality of the encoded portion of 360 degree video.

In step S715 the encoded portion of the 360 degree video is decoded. For example, a video decoder (e.g., decoder 775) entropy decodes the encoded portion of the 360 degree video (or encoded 2D representation) for example, Context Adaptive Binary Arithmetic Decoding to produce a set of quantized transform coefficients. The video decoder de-quantizes the transform coefficients given by the entropy decoded bits. For example, the entropy decoded video bits can be de-quantized by mapping values within a relatively small range to values in a relatively large range (e.g. opposite of the quantization mapping described above). Further, the video decoder inverse transforms the video bits using an indicated (e.g., in the header) transform (e.g., a KLT, a SVD, a DCT or an ADST).

The video decoder can filter the reconstructed pixel in the video frame. For example, a loop filter can be applied to the reconstructed block to reduce blocking artifacts. For example, a deblocking filter can be applied to the reconstructed block to reduce blocking distortion. Decoding the encoded portion of the 360 degree video (or 2D representation) can include using bandwidth or quality variables as input parameters for the decoding scheme, codec or video compression technology.

In step S720 the decoded portion of the 360 degree video is rendered. For example, the decoded portion of the 360 degree video can be sent as a sequential set of frames (or frame portions) (e.g., video stream 15) to a controller for display on a computer screen associated with a viewing device (e.g., headset 310 or a device associated with or coupled to headset 310).

The steps describe above with regard to FIG. 6 and FIG. 7 can be implemented during the playback operation or the seek operation described above. Accordingly, user 305 can change a view point (e.g., from portion 240 to portion 265) during the playback operation or the seek operation. During the playback operation a portion of a frame of the 360 degree video may be encoded, communicated and decoded in response to the change a view point. However, according to example embodiments during the seek operation the entire frame of the 360 degree video may be encoded, communicated and decoded in response to the change a view point. Accordingly, the user 305 can look around at different elements of the video during the seek operation and as the user 305 focuses on an element of the video, the system can respond by centering the 360 degree video in the field of view (e.g., instead of in a peripheral view) of the user 305. Further, if the user 305 finds an element of interest, the user can switch to the playback operation and resume watching the 360 degree video at the position in time and space associated with the element of interest.

Figure 8:
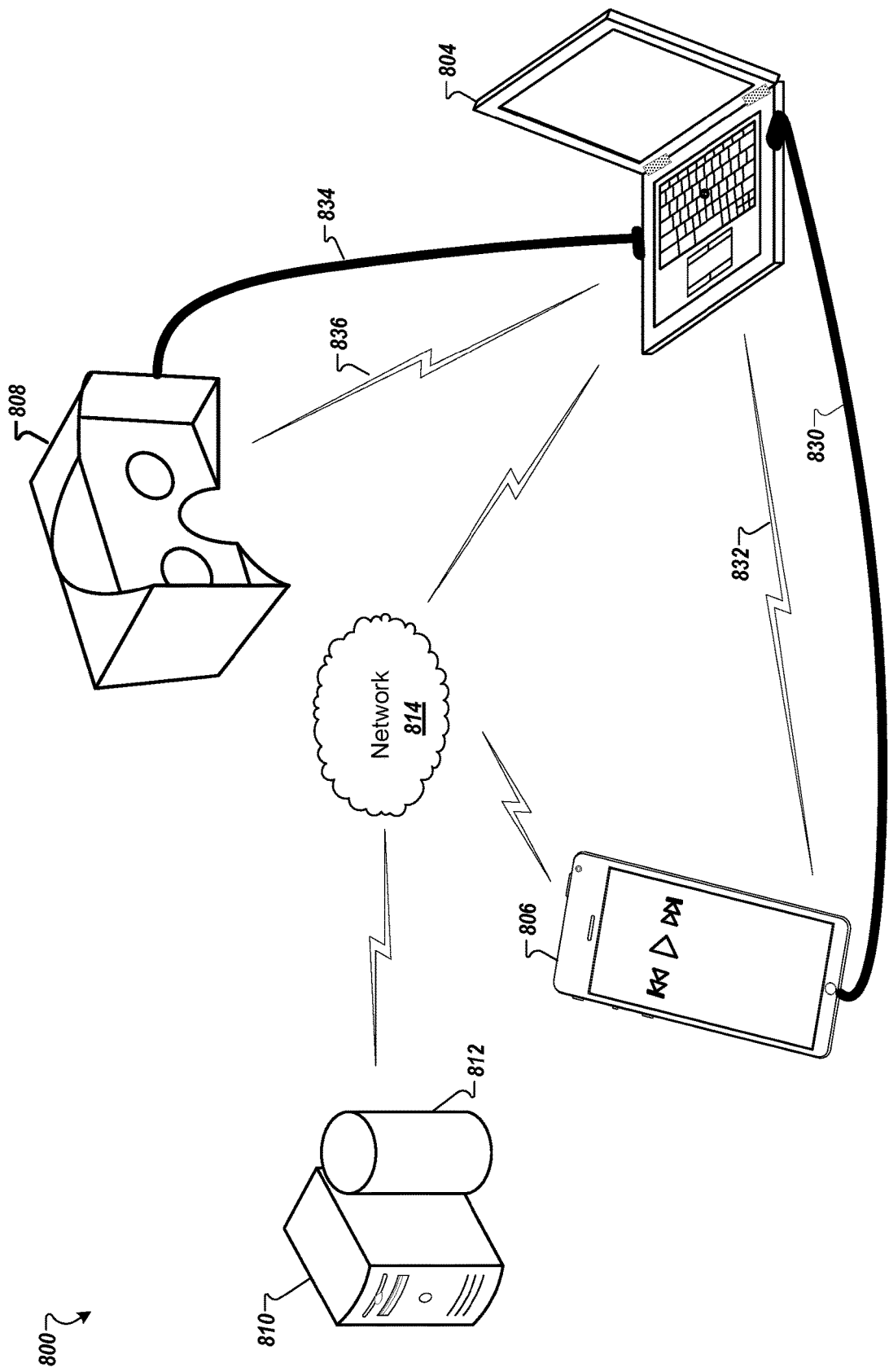
FIG. 8 is a diagram that illustrates an example system for interacting with a computer-generated, virtual reality (VR) environment.

FIG. 8 is a diagram that illustrates an example system 800 for creating and interacting with a computer-generated, virtual reality (VR) environment. In the example system 800, a VR application can execute on a first computing device 804 and/or on a second computing device 806. A VR headset 808 can be connected to the first computing device 804. The first computing device 804 can be connected to the second computing device 806. The second computing device 806 may be used as a controller (e.g., controller 315) and/or interface device in a VR environment (VR space). The first computing device 804 can provide content to the VR headset for the VR environment.

In some implementations, the first computing device 804 can be connected to/interfaced with the second computing device 806 using a wired connection 830. In some implementations, the first computing device 804 can be connected to/interfaced with the second computing device 806 using a wireless connection 832. In some implementations, the first computing device 804 can be connected to/interfaced with the VR headset 808 using a wired connection 834. In some implementations, the first computing device 804 can be connected to/interfaced with the VR headset 808 using a wireless connection 836.

The wired connection 830 can include a cable with an appropriate connector on either end for plugging into the second computing device 806 and the first computing device 804. For example, the cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the wired connection 834 can include a cable with an appropriate connector on either end for plugging into the VR headset 308 and the first computing device 804. For example, the cable can include a Universal Serial Bus (USB) connector on both ends. The USB connectors can be the same USB type connector or the USB connectors can each be a different type of USB connector.

The second computing device 806 and/or the VR headset 808 can wirelessly connect to/interface with the first computing device 804 using one or more of the high-speed wireless communication protocols described herein.

In the example system 800, the first computing device 804 may be a laptop computer, a desktop computer, a mobile computing device, or a gaming console. In some implementations, the first computing device 804 can be a mobile computing device that can be placed/located within the VR headset 808. The mobile computing device can include a display device that can be used as the screen for the VR headset 808. The mobile computing device can include hardware and/or software for executing a VR application. In addition, the mobile computing device can include hardware and/or software that can recognize, monitor, and track three dimensional (3D) movement of the second computing device 806 when the second computing device 806 is placed in front of or held within a range of positions relative to the VR headset 808. This allows the second computing device 806 to be rendered as an interface and/or controller in the VR space provided by the VR headset 808.

In some implementations, the first computing device 804 can execute the VR application and provide the content for the VR environment. In some implementations, the second computing device 806 can execute the VR application and can provide content from one or more content or streaming servers (e.g., content server 810). The one or more content or streaming servers (e.g., the content server 810) and one or more computer-readable storage devices (e.g., a content repository 812) can communicate with the first computing device 804 using a network 814 to provide (or stream) content to the first computing device 804. In addition or in the alternative, the one or more content or streaming servers (e.g., the content server 810) and the one or more computer-readable storage devices (e.g., the content repository 812) can communicate with the second computing device 806 using the network 814. The network 814 can be a public communications network or a private communications network, examples of which are described herein.

FIG. 9A illustrates a video encoder system according to at least one example embodiment. In the example of FIG. 9A, a video encoder system 900 may be, or include, at least one computing device and can represent virtually any computing device configured to perform the methods described herein. As such, the video encoder system 900 can include various components which may be utilized to implement the techniques described herein, or different or future versions thereof. By way of example, the video encoder system 900 is illustrated as including at least one processor 905, as well as at least one memory 910.

As shown in FIG. 9A, the video encoder system 900 includes the at least one processor 905, the at least one memory 910, a controller 920, and a video encoder 925. The at least one processor 905, the at least one memory 910, the controller 920, and the video encoder 925 are communicatively coupled via bus 915.

The at least one processor 905 may be utilized to execute instructions stored on the at least one memory 910, so as to thereby implement the various features and functions described herein, or additional or alternative features and functions. The at least one processor 905 and the at least one memory 910 may be utilized for various other purposes. In particular, the at least one memory 910 can represent an example of various types of memory (e.g., a non-transitory computer readable storage medium) and related hardware and software which might be used to implement any one of the modules described herein.

The at least one memory 910 may be configured to store data and/or information associated with the video encoder system 900. For example, the at least one memory 910 may be configured to store codecs associated with intra-prediction, filtering and/or mapping 360 degree video to 2D representations of the 360 degree video. The at least one memory 910 may be a shared resource. For example, the video encoder system 900 may be an element of a larger system (e.g., a server, a personal computer, a mobile device, and the like). Therefore, the at least one memory 910 may be configured to store data and/or information associated with other elements (e.g., image/video serving, web browsing or wired/wireless communication) within the larger system.

The controller 920 may be configured to generate various control signals and communicate the control signals to various blocks in video encoder system 900. The controller 920 may be configured to generate the control signals to implement the techniques described herein. The controller 920 may be configured to control the video encoder 925 to encode video data, a video frame, a video sequence, a streaming video, and the like according to example embodiments. For example, the controller 920 may generate control signals corresponding to inter-prediction, intra-prediction and/or mapping 360 degree video to 2D representations of the 360 degree video. The video encoder 925 may be configured to receive a video stream input 5 and output compressed (e.g., encoded) video bits 10. The video encoder 925 may convert the video stream input 5 into discrete video frames.

The compressed video data 10 may represent the output of the video encoder system 900. For example, the compressed video data 10 may represent an encoded video frame. For example, the compressed video data 10 may be ready for transmission to a receiving device (not shown). For example, the compressed video data 10 may be transmitted to a system transceiver (not shown) for transmission to the receiving device.

The at least one processor 905 may be configured to execute computer instructions associated with the controller 920 and/or the video encoder 925. The at least one processor 905 may be a shared resource. For example, the video encoder system 900 may be an element of a larger system (e.g., a server, a mobile device and the like). Therefore, the at least one processor 905 may be configured to execute computer instructions associated with other elements (e.g., image/video serving, web browsing or wired/wireless communication) within the larger system.

FIG. 9B illustrates a video decoder system according to at least one example embodiment. In the example of FIG. 9B, a video decoder system 950 may be at least one computing device and can represent virtually any computing device configured to perform the methods described herein. As such, the video decoder system 950 can include various components which may be utilized to implement the techniques described herein, or different or future versions thereof. By way of example, the video decoder system 950 is illustrated as including at least one processor 955, as well as at least one memory 960.

Thus, the at least one processor 955 may be utilized to execute instructions stored on the at least one memory 960, so as to thereby implement the various features and functions described herein, or additional or alternative features and functions. The at least one processor 955 and the at least one memory 960 may be utilized for various other purposes. In particular, the at least one memory 960 may represent an example of various types of memory (e.g., a non-transitory computer readable storage medium) and related hardware and software which might be used to implement any one of the modules described herein. According to example embodiments, the video encoder system 900 and the video decoder system 950 may be included in a same larger system (e.g., a personal computer, a mobile device and the like). The video decoder system 950 can be configured to perform the opposite or reverse operations of the encoder 900.

The at least one memory 960 may be configured to store data and/or information associated with the video decoder system 950. For example, the at least one memory 910 may be configured to store inter-prediction, intra-prediction and/or mapping 360 degree video to 2D representations of the 360 degree video. The at least one memory 960 may be a shared resource. For example, the video decoder system 950 may be an element of a larger system (e.g., a personal computer, a mobile device, and the like). Therefore, the at least one memory 960 may be configured to store data and/or information associated with other elements (e.g., web browsing or wireless communication) within the larger system.

The controller 970 may be configured to generate various control signals and communicate the control signals to various blocks in video decoder system 950. The controller 970 may be configured to generate the control signals in order to implement the video decoding techniques described below. The controller 970 may be configured to control the video decoder 975 to decode a video frame according to example embodiments. The controller 970 may be configured to generate control signals corresponding to prediction, filtering and/or mapping between 360 degree video to 2D representations of the 360 degree video. The video decoder 975 may be configured to receive a compressed (e.g., encoded) video data 10 input and output a video stream 15. The video decoder 975 may convert discrete video frames of the compressed video data 10 into the video stream 15.

The at least one processor 955 may be configured to execute computer instructions associated with the controller 970 and/or the video decoder 975. The at least one processor 955 may be a shared resource. For example, the video decoder system 950 may be an element of a larger system (e.g., a personal computer, a mobile device, and the like). Therefore, the at least one processor 955 may be configured to execute computer instructions associated with other elements (e.g., web browsing or wireless communication) within the larger system.

Figure 10:
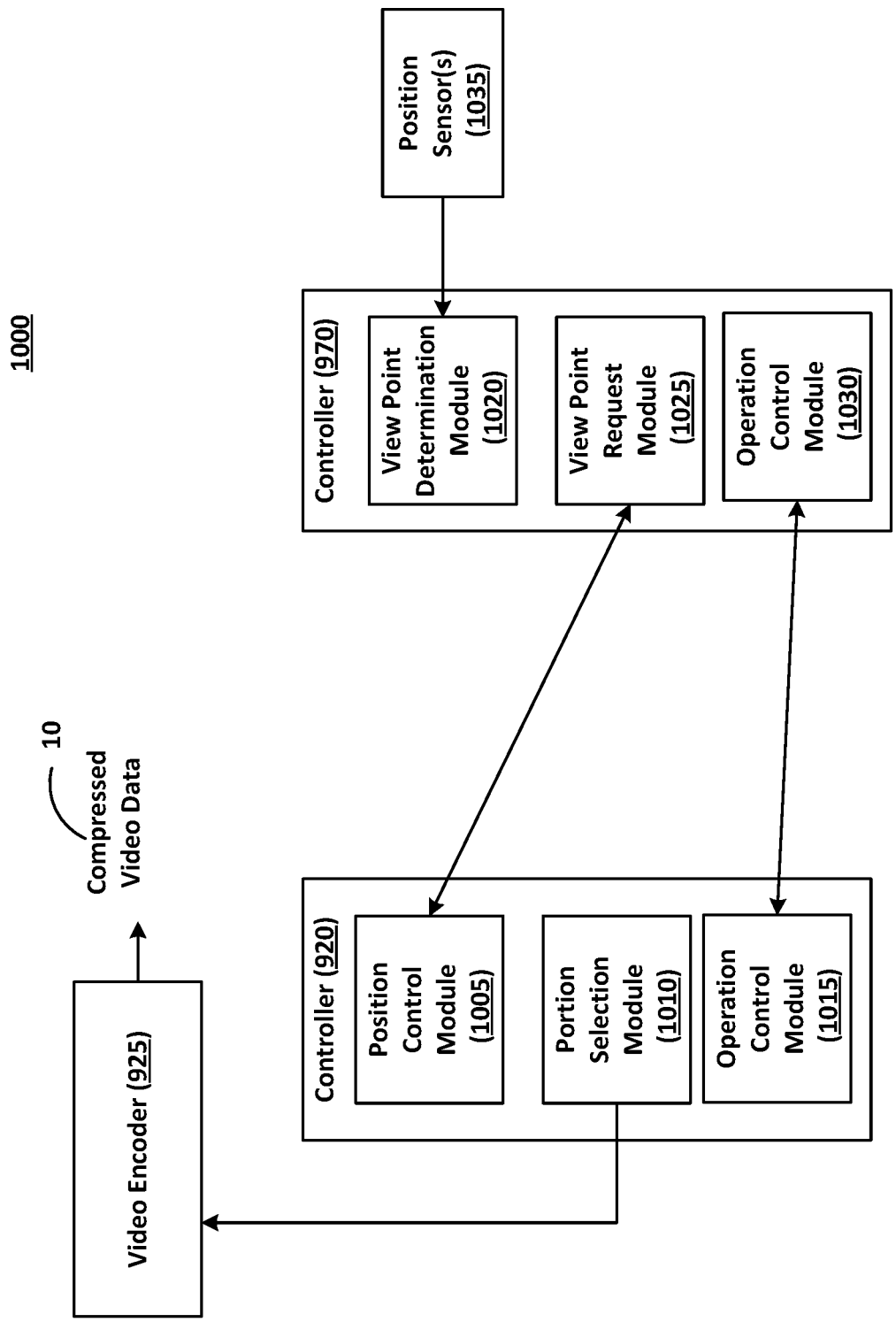
FIG. 10 illustrates a system according to at least one example embodiment.

FIG. 10 illustrates a system 1000 according to at least one example embodiment. As shown in FIG. 10, the system 1000 includes the controller 920, the controller 970, the encoder 925 and a position sensor 1035. The controller 920 further includes a position control module 1005, a portion selection module 1010 and an operational control module 1015. The controller 970 further includes a view point determination module 1020, a view point request module 1025 and an operational control module 1030.

According to an example implementation, the operation control module 1030 can be configured to determine a change in operation type associated with a 360 degree video. The change in operation type can be automatic. For example, the 360 degree video can automatically play (e.g., in response to opening the 360 degree video), automatically stop (e.g., in response to the 360 degree video ending), and the like. The change in operation type can be manual. For example, the 360 degree video can be controlled by a controller (e.g., controller 315). In response to determining a change in operation type, the operation control module 1030 can be configured to communicate an indicator to the operation control module 1015 using, for example, a Hypertext Transfer Protocol (HTTP). The operation control module 1015 can be configured to cause the encoder to perform one or more operations (e.g., via controller 920) based on the indicator. For example, operation control module 1015 can be configured to cause the selection of an entire frame of the 360 degree video to be encoded by the video encoder 925 in response to determining the indicator indicates a seek operation.

According to an example implementation, the position sensor 1035 detects a position (or change in position) of a viewers eyes (or head), the view point determination module 1020 determines a view point based on the detected position and the view point request module 1025 communicates the view point as part of a request for a portion of a frame of 360 degree video. According to another example implementation, the position sensor 1035 detects a position (or change in position) based on an image panning position as rendered on a display. For example, a user may use a mouse, a track pad or a gesture (e.g., on a touch sensitive display) to select, move, drag, expand and/or the like a portion of the 360 degree video as rendered on the display. The view point may be communicated together with a request for a portion of a frame of the 360 degree video. The view point may be communicated separate from a request for a frame of the 360 degree video. For example, the request for the frame of the 360 degree video may be in response to a changed view point resulting in a need to replace previously requested and/or a queued frame.

The position control module 1005 receives and processes the request for the portion of the frame of the 360 degree video. For example, the position control module 1005 can determine a frame and a position of the portion of the frame of the 360 degree video based on the view point. Then the position control module 1005 can instruct the portion selection module 1010 to select the portion of the frame of the 360 degree video. Selecting the portion of the frame of the 360 degree video can include passing a parameter to the encoder 925. The parameter can be used by the encoder 925 during the encoding of the 360 degree video. Accordingly, the position sensor 1035 can be configured to detect a position (orientation, change in position and/or change in orientation) of a viewer's eyes (or head). For example, the position sensor 1035 can include other mechanisms, such as, an accelerometer in order to detect movement and a gyroscope in order to detect position. Alternatively, or in addition to, the position sensor 1035 can include a camera or infrared sensor focused on the eyes or head of the viewer in order to determine a position of the eyes or head of the viewer. The position sensor 1035 can be configured to communicate position and change in position information to the view point determination module 1020.

The view position determination module 1020 can be configured to determine a view point (e.g., a portion of a 360 degree video that a viewer is currently looking at) in relation to the 360 degree video. The view point can be determined as a position, point or focal point on the 360 degree video. For example, the view point could be a latitude and longitude position on the 360 degree video. The view point (e.g., latitude and longitude position or side) can be communicated via the viewpoint request module 1025 to the position control module 1005 using, for example, a Hypertext Transfer Protocol (HTTP).

The position control module 1005 may be configured to determine a position based on the view point (e.g., frame and position within the frame) of the portion of the frame of the 360 degree video. For example, the position control module 1005 can select a square or rectangle centered on the view point (e.g., latitude and longitude position or side). The portion selection module 1010 can be configured to select the square or rectangle as a block, or a plurality of blocks. The portion selection module 1010 can be configured to instruct (e.g., via a parameter or configuration setting) the encoder 925 to encode the selected portion of the frame of the 360 degree video.

Figure 11:
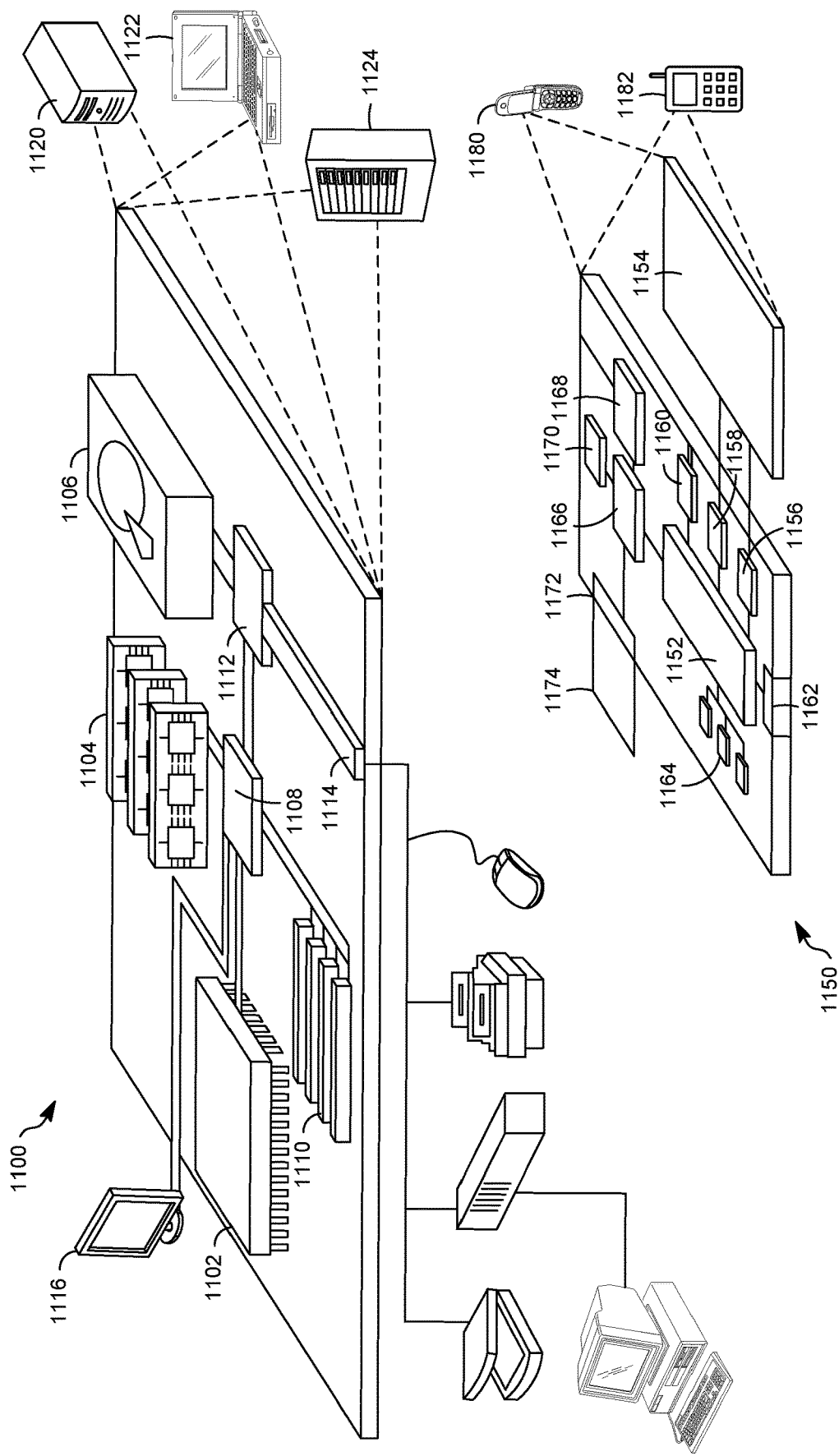
FIG. 11 shows an example of a computer device and a mobile computer device according to at least one example embodiment.

FIG. 11 shows an example of a computer device 1100 and a mobile computer device 1150, which may be used with the techniques described here. Computing device 1100 is intended to represent various forms of digital computers, such as laptops, desktops, workstations, personal digital assistants, servers, blade servers, mainframes, and other appropriate computers. Computing device 1150 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 1100 includes a processor 1102, memory 1104, a storage device 1106, a high-speed interface 1108 connecting to memory 1104 and high-speed expansion ports 1110, and a low speed interface 1112 connecting to low speed bus 1114 and storage device 1106. Each of the components 1102, 1104, 1106, 1108, 1110, and 1112, are interconnected using various busses, and may be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as display 1116 coupled to high speed interface 1108. In other implementations, multiple processors and/or multiple buses may be used, as appropriate, along with multiple memories and types of memory. Also, multiple computing devices 1100 may be connected, with each device providing portions of the necessary operations (e.g., as a server bank, a group of blade servers, or a multi-processor system).

The memory 1104 stores information within the computing device 1100. In one implementation, the memory 1104 is a volatile memory unit or units. In another implementation, the memory 1104 is a non-volatile memory unit or units. The memory 1104 may also be another form of computer-readable medium, such as a magnetic or optical disk.

The storage device 1106 is capable of providing mass storage for the computing device 1100. In one implementation, the storage device 1106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1104, the storage device 1106, or memory on processor 1102.

The high speed controller 1108 manages bandwidth-intensive operations for the computing device 1100, while the low speed controller 1112 manages lower bandwidth-intensive operations. Such allocation of functions is exemplary only. In one implementation, the high-speed controller 1108 is coupled to memory 1104, display 1116 (e.g., through a graphics processor or accelerator), and to high-speed expansion ports 1110, which may accept various expansion cards (not shown). In the implementation, low-speed controller 1112 is coupled to storage device 1106 and low-speed expansion port 1114. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1100 may be implemented in a number of different forms, as shown in the figure. For example, it may be implemented as a standard server 1120, or multiple times in a group of such servers. It may also be implemented as part of a rack server system 1124. In addition, it may be implemented in a personal computer such as a laptop computer 1122. Alternatively, components from computing device 1100 may be combined with other components in a mobile device (not shown), such as device 1150. Each of such devices may contain one or more of computing device 1100, 1150, and an entire system may be made up of multiple computing devices 1100, 1150 communicating with each other.

Computing device 1150 includes a processor 1152, memory 1164, an input/output device such as a display 1154, a communication interface 1166, and a transceiver 1168, among other components. The device 1150 may also be provided with a storage device, such as a microdrive or other device, to provide additional storage. Each of the components 1150, 1152, 1164, 1154, 1166, and 1168, are interconnected using various buses, and several of the components may be mounted on a common motherboard or in other manners as appropriate.

The processor 1152 can execute instructions within the computing device 1150, including instructions stored in the memory 1164. The processor may be implemented as a chipset of chips that include separate and multiple analog and digital processors. The processor may provide, for example, for coordination of the other components of the device 1150, such as control of user interfaces, applications run by device 1150, and wireless communication by device 1150.

Processor 1152 may communicate with a user through control interface 1158 and display interface 1156 coupled to a display 1154. The display 1154 may be, for example, a TFT LCD (Thin-Film-Transistor Liquid Crystal Display) or an OLED (Organic Light Emitting Diode) display, or other appropriate display technology. The display interface 1156 may comprise appropriate circuitry for driving the display 1154 to present graphical and other information to a user. The control interface 1158 may receive commands from a user and convert them for submission to the processor 1152. In addition, an external interface 1162 may be provide in communication with processor 1152, to enable near area communication of device 1150 with other devices. External interface 1162 may provide, for example, for wired communication in some implementations, or for wireless communication in other implementations, and multiple interfaces may also be used.

The memory 1164 stores information within the computing device 1150. The memory 1164 can be implemented as one or more of a computer-readable medium or media, a volatile memory unit or units, or a non-volatile memory unit or units. Expansion memory 1174 may also be provided and connected to device 1150 through expansion interface 1172, which may include, for example, a SIMM (Single In Line Memory Module) card interface. Such expansion memory 1174 may provide extra storage space for device 1150, or may also store applications or other information for device 1150. Specifically, expansion memory 1174 may include instructions to carry out or supplement the processes described above, and may include secure information also. Thus, for example, expansion memory 1174 may be provide as a security module for device 1150, and may be programmed with instructions that permit secure use of device 1150. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1164, expansion memory 1174, or memory on processor 1152, that may be received, for example, over transceiver 1168 or external interface 1162.

Device 1150 may communicate wirelessly through communication interface 1166, which may include digital signal processing circuitry where necessary. Communication interface 1166 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1168. In addition, short-range communication may occur, such as using a Bluetooth, Wi-Fi, or other such transceiver (not shown). In addition, GPS (Global Positioning System) receiver module 1170 may provide additional navigation- and location-related wireless data to device 1150, which may be used as appropriate by applications running on device 1150.

Device 1150 may also communicate audibly using audio codec 1160, which may receive spoken information from a user and convert it to usable digital information. Audio codec 1160 may likewise generate audible sound for a user, such as through a speaker, e.g., in a handset of device 1150. Such sound may include sound from voice telephone calls, may include recorded sound (e.g., voice messages, music files, etc.) and may also include sound generated by applications operating on device 1150.

The computing device 1150 may be implemented in a number of different forms, as shown in the figure. For example, it may be implemented as a cellular telephone 1180. It may also be implemented as part of a smart phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
   receiving, from a device displaying a portion of a first frame of a streaming 360 degree video, an indication that a seek operation is triggered, the portion of the first frame corresponding with a field of view of a user of the device;
   selecting a second frame of the streaming 360 degree video based on the seek operation;
   encoding a first portion of the streaming 360 degree video associated with the second frame and a second portion of the streaming 360 video associated with the second frame, the first portion of the streaming 360 video corresponding with the field of view of the user of the device and corresponding to the portion of the first frame, the second portion of the streaming 360 degree video being outside at least a portion of the field of view of the user, the first portion of the streaming 360 video and the second portion of the streaming 360 video each being smaller than the second frame; and
   streaming both the first portion of the streaming 360 degree video and the second portion of the streaming 360 degree video within the field of view of the device to the user during the seek operation.

2. The method of claim 1, wherein the second portion of the streaming 360 degree video extends outward from a center of the first portion of the streaming 360 degree video and begins at a boundary of the first portion of the second frame.

3. The method of claim 1, wherein the seek operation is one of a fast forward operation or a review operation.

4. The method of claim 1, wherein the selecting of the second frame based on the seek operation includes:
   determining if the seek operation is a fast forward operation, and
   in response to determining the seek operation is a fast forward operation,
      select a subsequent frame of the 360 degree video going forward in order as the second frame.

5. The method of claim 1, wherein the selecting of the second frame based on the seek operation includes:
   determining if the seek operation is a review operation, and
   in response to determining the seek operation is a review operation,
      select a previous frame of the 360 degree video going forward in order as the second frame.

6. The method of claim 1, wherein the encoding includes encoding the first portion of the streaming 360 degree and second portion of the streaming 360 degree at a framerate based on a seek speed of the seek operation.

7. The method of claim 1, further comprising:
   encoding the portion of the first frame of the streaming 360 degree video using a projection technique; and
   communicating the encoded first frame to the device, wherein the encoding includes:
      centering the first portion of the streaming 360 video based on a view point of the user,
      projecting the streaming 360 video using the projection technique, and
      adding the second portion of the streaming 360 video around the centered first portion of the streaming 360 video.

8. The method of claim 1, further comprising:
   encoding the portion of the first frame of the streaming 360 degree video using a first projection technique; and
   communicating the encoded first frame to the device, wherein the encoding of includes encoding at least the second portion of the streaming 360 video using a second projection technique.

9. The method of claim 1, further comprising:
   receiving, from the device during the seek operation, an indication that a view point of the user has changed; and
   encoding the second portion of the streaming 360 degree video based on the changed view point.

10. The method of claim 1, further comprising:
    receiving, from the device during the seek operation, an indication that a view point of the user has changed;
    encoding the second portion of the streaming 360 degree video based on the changed view point;
    receiving, from the device during the seek operation, an indication that a playback operation is triggered;
    encoding a third portion of the streaming 360 degree video based on the changed view point; and
    communicating the encoded third portion to the device.

11. A content server comprising:
    a controller configured to:
       receive, from a device rendering a portion of a first frame of a streaming 360 degree video, an indication that a seek operation is triggered, the portion of the first frame being based on a view point of a user of the device,
       select a second frame of the streaming 360 degree video based on the seek operation; and
    an encoder configured to encode a portion of the second frame for viewing in a field of view of the device, the portion of the second frame being larger than the portion of the first frame and being communicated in a stream within the field of view of the device, the portion of the second frame being smaller than an entirety of the second frame.

12. The content server of claim 11, wherein the second frame has a first portion, the portion of the second frame is a second portion of the second frame, the second portion of the second frame extends outward from a center of the first portion of the second frame and begins at a boundary of the first portion of the second frame.

13. The content server of claim 11, wherein the selecting of the second frame based on the seek operation includes:
    determining if the seek operation is a fast forward operation, and
    in response to determining the seek operation is a fast forward operation, select a subsequent frame of the 360 degree video going forward in order as the second frame.

14. The content server of claim 11, wherein the selecting of the second frame based on the seek operation includes:

determining if the seek operation is a review operation, and in response to determining the seek operation is a review operation, select a previous frame of the 360 degree video going forward in order as the second frame.

15. The content server of claim 11, wherein the second frame has a first portion, the portion of the second frame is a second portion of the second frame, the encoder is further configured to:

center the first portion of the second frame based on the view point, project the second frame using a projection technique, and add the second portion around the centered first portion.

16. The content server of claim 11, wherein the encoder is further configured to:

encode the second frame of the streaming 360 degree video using a second projection technique.

17. The content server of claim 11, wherein the controller is further configured to:

receive, from the device during the seek operation, an indication that the view point has changed; and cause the encoder to encode the second frame of the streaming 360 degree video based on the changed view point, the portion of the second frame corresponds with the changed view point.

18. The content server of claim 11, wherein the controller is further configured to:

receive, from the device during the seek operation, an indication that the view point has changed;

cause the encoder to encode the second frame of the streaming 360 degree video based on the changed view point, the portion of the second frame corresponds with the changed view point;

receive, from the device during the seek operation, an indication that a playback operation is triggered;

cause the encoder to encode a portion of a third frame of the streaming 360 degree video based on the changed view point; and communicate the encoded third frame to the device.

19. A non-transitory computer-readable storage medium having stored thereon computer executable program code which, when executed on a computer system, causes the computer system to perform steps comprising:

receiving, from a device displaying a portion of a first frame of a streaming 360 degree video, an indication that a seek operation is triggered, the portion of the first frame being based on a view point of a user of the device;

selecting a second frame of the streaming 360 degree video based on the seek operation;

encoding a portion of the second frame, the portion of the second frame being larger than the portion of the first frame, the portion of the second frame including a sub-portion corresponding to the portion of the first frame, the portion of the second frame being smaller than an entirety of the second frame; and communicating the encoded portion of the second frame to the device as a stream.

20. The non-transitory computer-readable storage medium of claim 19, wherein the portion of the second frame extends outward from a center of a first portion of the second frame and begins at a boundary of the first portion of the second frame.

* * * * *

UNITED STATES PATENT AND TRADEMARK OFFICE
CERTIFICATE OF CORRECTION

| | | |
|---|---|---|
| PATENT NO. | : 10,554,953 B2 | Page 1 of 1 |
| APPLICATION NO. | : 15/844599 | |
| DATED | : February 4, 2020 | |
| INVENTOR(S) | : Raphael | |

It is certified that error appears in the above-identified patent and that said Letters Patent is hereby corrected as shown below:

In Column 23, Claim 1, Line 28, delete "360 video" and insert --360 degree video-- at each occurrence throughout the Patent.

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*